United States Patent Office 3,448,018
Patented June 3, 1969

3,448,018
PREVENTING FOULING OF ELECTRODES
James A. Kelly and James L. Teal, Midland, Mich., assignors to The Dow Chemical Company, Midland, Mich., a corporation of Delaware
No Drawing. Filed Jan. 17, 1966, Ser. No. 520,895
Int. Cl. C23f 15/00
U.S. Cl. 204—1     2 Claims

ABSTRACT OF THE DISCLOSURE

In aqueous systems capable of supporting biological growths which cause fouling of sensor electrodes employed in such systems, fouling is prevented by cooling the aqueous system to a controlled temperature below about 42° F. but above its freezing point prior to contacting such electrodes.

---

The present invention relates to a method for preventing the fouling of electrodes in contact with aqueous systems. More particularly, the invention concerns preventing the formation of interfering biological growths on such electrodes.

Currently there are a number of electrical measurements made utilizing electrodes directly contacting the systems to be measured. In many of these systems, conditions exis to which promote biological growths on the electrodes. Manifestly, such growths can interfere seriously with the sensitivity and magnitude of the electrode interaction with the system. Exemplary, but not inclusive of such systems, are waters of river, lake and waste stream origins.

Attempts to solve the problem of biological fouling of electrodes have involved a variety of approaches including simply physically cleaning the electrodes, treating the tested water with biocides and building hydraulically self-cleansing electrodes. Although previous techniques have been successful to a degree, it would be desirable, and it is a particular object and benefit of the invention, to provide a novel and effective method for preventing the biological fouling of electrodes in contact with aqueous systems. Most especially, it is an object of the invention to provide a novel and improved method for measuring electrically-associated quality parameters of aqueous systems through the use of electrodes. A particular object is to provide an improved method for avoiding biological fouling of equipment used for measuring the dissolved oxygen content of aqueous systems.

In accordance with the present invention, an improved method is provided for measuring an electrically-associated quality of an aqueous system through sensing electrodes. The aqueous system to be analyzed is contacted with at least one electrode-sensor. Prior to its coming into contact with the electrode, the aqueous system is cooled to a temperature below about 42° F., preferably below about 38° F. Temperatures down to the freezing point of the system can be used if desired.

Electrically-associated qualities of aqueous systems conventionally detected through electrodes include dissolved oxygen, pH, conductivity and particle numbers. In making such measurements, the aqueous system may be under static or dynamic conditions. Most often the latter condition will prevail, as in the evaluation of flowing aqueous streams such as rivers and sewage processing streams.

In carrying out the invention, water to be contacted by the electrode-sensor is cooled by suitable refrigerating means to a desired temperature. If the body of water on which the measurement is desired is a relatively large flowing stream or lake, a sample thereof, preferably in the form of a continuous sampling stream, is established. Usually such a sampling stream will have a flow rate from about 10 to about 200 cubic centimeters per minute. The smaller the sample stream, the lower will be the refrigeration requirements to accomplish the desired cooling.

If dissolved oxygen is to be measured, the sample stream should be insulated from the atmosphere, i.e. handled in a manner to prevent contact with oxygen within the refrigerating means and until the stream has passed the electrode-sensor. This precaution is desirable due to the fact that the capacity of water for dissolved oxygen increases as its temperature is lowered. The insulation of the sample stream assures results representative of the water in its natural condition.

It is, of course, necessary that the measurements made at the reduced temperature be calibrated with data valid at comparable temperatures. In the instance of conductivity and pH measurements, both the parameter to be measured and the electrode reaction are affected by the temperature change. Calibration data should take into account the change in these parameters as a result of temperature change. As a consequence it is important that the cooling of the sample stream be to a controlled or uniform temperature at which the calibration is valid.

It has been discovered that electrodes normally fouled by biological growth within a matter of a few days are rendered effectively free of such fouling for extended periods of time thereby eliminating, or at least minimizing, maintenance and auxiliary treatment costs, by the use of the invention as herein described.

For instance, dissolved oxygen was being measured in a river utilizing a dissolved oxygen electrode-sensor such as the one described by Keyser in "Dissolved Oxygen and Related Measurements in Rivers," ISA Journal, November 1965, pp. 45–48. It was necessary to clean the electrode daily or oftener, even though means were provided for rapidly spraying the electrode sensing surface with the sample stream. When the sample stream was enclosed and cooled to a temperature of about 38° F. prior to flowing it by the electrode, biological growth deposition was inhibited to the point that electrode inspections could be reduced to a frequency about once every seven days and even then cleaning was seldom required.

The advantages of the invention become more pronounced as the temperature of the water being analyzed increases thereby enhancing biological growth possibilities. Manifestly, as natural temperature of the water drops below about 45° F. need for the invention disappears.

What is claimed is:

1. In a method for measuring the dissolved oxygen content of an aqueous system which will support biological growth through the use of an electrode-sensor contacting the aqueous system, the improvements which comprise establishing from said aqueous system a sampling stream insulated from the atmosphere, then lowering the temperature of the sampling stream to a controlled temperature below about 42° F. but above its freezing point and then flowing said sampling stream by said electrode-sensor.

2. A method as in claim 1 wherein the temperature of the water is reduced to a controlled temperature below about 38° F. but above its freezing point.

References Cited

UNITED STATES PATENTS 2,830,945   4/1958   Keidel _____ 204—195
3,077,446   2/1963   Van den Berg _____ 204—195

(Other references on following page)

UNITED STATES PATENTS

| | | | |
|---|---|---|---|
| 3,086,169 | 4/1963 | Eynon | 324—30 |
| 3,147,202 | 9/1964 | Johnson et al. | 204—1.1 |
| 3,217,250 | 11/1965 | Goemann | 324—30 |
| 3,322,662 | 5/1967 | Mackereth | 204—195 |

OTHER REFERENCES

Cox: "Deep Sea Research," vol. 9, November-December 1962, pp. 504–506.

Keyser: "ISA Journal," November 1965, pp. 45–48.

JOHN H. MACK, *Primary Examiner*

T. TUNG, *Assistant Examiner.*

324—29